(12) United States Patent  (10) Patent No.: US 8,659,613 B2
Meier  (45) Date of Patent: Feb. 25, 2014

(54) METHOD AND SYSTEM FOR DISPLAYING AN IMAGE GENERATED BY AT LEAST ONE CAMERA

(75) Inventor: Peter Meier, Munich (DE)

(73) Assignee: Metaio GmbH, Munich (DE)

( * ) Notice: Subject to any disclaimer, the term of this patent is extended or adjusted under 35 U.S.C. 154(b) by 575 days.

(21) Appl. No.: 12/921,934

(22) PCT Filed: Mar. 14, 2008

(86) PCT No.: PCT/EP2008/002058
§ 371 (c)(1),
(2), (4) Date: Sep. 10, 2010

(87) PCT Pub. No.: WO2009/112057
PCT Pub. Date: Sep. 17, 2009

(65) Prior Publication Data
US 2011/0001760 A1   Jan. 6, 2011

(51) Int. Cl.
*G09G 5/00* (2006.01)
(52) U.S. Cl.
USPC ........................................ 345/581; 345/633
(58) Field of Classification Search
None
See application file for complete search history.

(56) References Cited

U.S. PATENT DOCUMENTS

| | | | |
|---|---|---|---|
| 5,559,554 A | 9/1996 | Uekane et al. | |
| 5,787,186 A * | 7/1998 | Schroeder | 382/115 |
| 5,969,773 A | 10/1999 | Im | |
| 7,693,584 B2 * | 4/2010 | Pryor et al. | 700/17 |
| 7,973,824 B2 * | 7/2011 | Kawahara | 348/222.1 |
| 2004/0012701 A1 | 1/2004 | Nagai et al. | |
| 2004/0136574 A1 * | 7/2004 | Kozakaya et al. | 382/118 |
| 2005/0073727 A1 | 4/2005 | Park et al. | |
| 2005/0190972 A1 | 9/2005 | Thomas et al. | |
| 2007/0201724 A1 | 8/2007 | Steinberg et al. | |
| 2007/0222796 A2 * | 9/2007 | Stotts et al. | 345/629 |

FOREIGN PATENT DOCUMENTS

| | | |
|---|---|---|
| DE | 10128015 | 6/2001 |
| DE | 20203367 | 3/2002 |
| DE | 10301849 | 1/2003 |
| DE | 102004046144 | 9/2004 |
| DE | 102005011126 | 3/2005 |
| JP | 2008 53925 | 3/2008 |

OTHER PUBLICATIONS

International Search Report and Written Opinion for PCT Application No. PCT/EP2008/002058, dated Feb. 2, 2009, 21pages.

(Continued)

*Primary Examiner* — Ryan R Yang
(74) *Attorney, Agent, or Firm* — ARC IP Law, PC; Joseph J. Mayo

(57) ABSTRACT

The invention is directed to a method and system for displaying an image generated by at least one camera (11) on an image displaying means (13), comprising the steps of generating at least one image (15) by the camera (11) capturing at least one real object (12), displaying the image (15) on the image displaying means (13), analysing (2.1A, 2.1B, 2.1C) at least one characteristic property of the at least one image and/or of the camera when generating the image, and automatically determining whether the at least one image (15) is to be displayed on the image displaying means (13) in mirrored fashion, or not, depending on the at least one characteristic property. The method and system is capable of automatically determining whether the at least one image is to be displayed in mirrored fashion, or not, depending on the particular situation.

10 Claims, 8 Drawing Sheets

Version B

(56) References Cited

OTHER PUBLICATIONS

Nobuko Taketa Virtual PopUp Book Based on Augmented Reality, Human Interface and the Management of Info . . . vol. 4558, Jul. 22, 2007.

Volker Paelke, Christian Reimann, "Authoring von Augmented-Reality-Anwendungen", Seminars GEO VIS 2006, Apr. 5-6, 2006, pp. 37-45.

Duenser, A. Hornecker E. "Lessons from an AR book study", Proceedings of the first Intl' Conference on Tangible . . . TEL 2007, Feb. 15, 2007.

Grasset, R, Duenser, A., Seichter, H., Billinghurst, M.: "The Mixed Reality Book: A New Multimedia Reading Experience" . . . Proceedings of 2007.

Hornecker, E., Dunser, A.: "Supporting Early Literacy with Augmented Books Experiences with an Exploratory Study", Proceedings of the German Society of . . . 2007.

Billinghurst, M., Kato, H., Poupyrev, I.: "The Magic Book: A transitional AR interface", Computers and Graphics 25(5), 2001, pp. 745-753.

J. M. and Doreen Darnell: "The eyeMagic Book A Report into Augmented Reality Storytelling in the Context of a Children's Workshop", 2003.

\* cited by examiner

Version A

Version B

METHOD AND SYSTEM FOR DISPLAYING AN IMAGE GENERATED BY AT LEAST ONE CAMERA

CROSS-REFERENCE TO RELATED APPLICATIONS

This application is a National Stage entry of International Application No. PCT/EP2008/002058 filed 14 Mar. 2008, the contents of which are hereby incorporated herein by reference in their entirety.

The present invention is directed to a method and system for displaying an image generated by at least one camera on an image displaying means, wherein the at least one image is generated by the camera capturing at least one real object and the image displaying means is coupled with the camera for displaying the image.

Such system is, for example, employed in situations such as video conferences where participants of the video conference are captured by at least one camera taking an image or multiple images of the participants and the environment, and transmitting the image or images to the respective other party of the conference. In some cases, the image which is transmitted to the other party of the conference may also be displayed to oneself so that there is a possibility for oneself to check what kind of image is transmitted to the other party. In such situations, the problem may arise that the image displayed to oneself is not intuitive since in a situation where the camera is placed in front, each movement of a person captured by the camera is displayed as a reversed or inverted movement on the image. For example, if the person captured by the camera is moving to the right, the image shown to that person and transmitted to the other party displays a movement of the person to the left when the camera is disposed in front of the person.

Another application where a camera captures at least one real object and displays an image on a displaying means is described, for example, in: Volker Paelke, Christian Reimann, "Authoring von Augmented-Reality-Anwendungen", Deutsche Gesellschaft für Kartographie, Kartographische Schriften, Band 10: Aktuelle Entwicklungen in Geoinformation and Visualisierung, Beiträge des Seminars GEO VIS 2006, 5-6 Apr. 2006, Potsdam, Seiten 37 bis 45. This document describes the authoring and the employment of a so called "magic-book". In such application, the camera takes a picture of a book read by a person, wherein the book is displayed on a display screen and virtual objects may be displayed in addition to the image of the real world, so that the book displayed on the display screen is augmented with virtual objects of any kind on a display screen. In such application, the same situation may arise as described above with respect to the video conference, in that each movement of the person sitting in front of the book is displayed on the display screen in a reversed or inverted manner when the camera is placed in front of the person and the book. On the other hand, there may be also the situation where the camera takes the picture of the book from the person's view so that the person reading the book is not captured by the camera. In this situation, when the book is moved to the right, for example, the image showing the book also shows the movement of the book to the right, so that in this situation there is no reverse or inverted display of the real object captured by the camera.

This so called "mirror-view-problem" is described, for example, in: Dünser, A., Hornecker, E.: "Lessons from an AR book study", in proceedings of the First International Conference on Tangible and Embedded Interaction (TEI 2007), Feb. 15-17, 2007, Baton Rouge, La., USA. The mirror-view-problem is described as "The mirror view creates spatial confusion 'Where am I'?". However, this document describes only the problem but presents no solution to this problem.

A further document describing the magic book is Grasset, R., Dünser, A., Seichter, H., Billinghurst, M.: "The Mixed Reality Book: A New Multimedia Reading Experience", proceedings of CHI'2007 Interactivity, which document only describes the employment of a magic book, but the mirror-view-problem is not addressed in this document.

Further, Hornecker, E., Dünser, A.: "Supporting Early Literacy with Augmented Books—Experiences with an Exploratory Study", Proceedings of the German Society of Informatics annual conference GI-Jahrestagung 2007, GI-Edition—Lecture Notes in Informatics (LNI), Bonner Köllen Verlag (2007) describes that due to the webcam setup the augmented image on-screen was mirrored, resulting in repeated "spatial confusion" about whether the paddle should move back or forth. Video analysis of the second trial confirmed the interaction issues reported in [DH107] (which source refers to Dünser and Hornecker 2007 "Lessons from an AR Book Study", as referred to above). Children expected the AR-objects on paddles to exhibit physical 3D behaviour, were confused by the mirrored image on the screen, and required assistance to learn how to switch between text sequences on-screen and interactive sequences on paper. In the author's exemplary study, they have uncovered a range of issues that can severely hamper the user experience in interacting with an augmented book. Some issues (such as the mirror view) may appear rather trivial. Yet their occurrence despite the relevant maturity of the technology shows that awareness of these subtle design issues is still missing.

Furthermore, in the prior art there are known applications which augment conventional books or things with virtual objects using the so called Augmented Reality (AR) technology: H.K.U.I.P. Mark Billinghurst, The Magic Book: A transitional AR interface, Computers and Graphics, 25(5), 2001, pages 745-753 and J. M. Und Doreen Darnell, The eyeMagic Book—A Report into Augmented Reality Storytelling in the Context of a Children's Workshop, 2003. General applications of Augmented Reality, for example in production planning or the like, are described, for example, in DE 101 28 015 A1, DE 10 2004 046 144 A1 and DE 202 03 367 U1. Augmented Reality Systems for product presentation are known from DE 103 01 849 B4. A further application is described in DE 10 2005 011 126 A1.

In computer applications, there is also known a webcam driver called "Logitech QuickCam Pro 5000" provided by Logitech, driver date Oct. 11, 2007, driver version 11.5.0.1145, signed by Microsoft, which driver software enables a user of a webcam to manually mirror or flip the image taken by the webcam.

It is an object of the present invention to provide a method for displaying an image generated by a camera on an image displaying means which is capable of providing an improved intuitive display of the image on the image displaying means in situations as described above.

According to a first aspect of the invention, there is disclosed a method for displaying an image generated by at least one camera on an image displaying means, comprising the steps of generating at least one image by the camera capturing at least one real object, displaying the image on the image displaying means, analysing at least one characteristic property of the at least one image and/or of the camera when generating the image, and automatically determining whether the at least one image is to be displayed on the image displaying means in mirrored fashion, or not, depending on the at least one characteristic property.

According to another aspect of the invention, there is disclosed a system for displaying an image, comprising a camera for generating at least one image capturing at least one real object, image displaying means coupled with the camera for displaying the image generated by the camera, and a processing unit connected with the camera and the image displaying means for analysing at least one characteristic property of the at least one image and/or of the camera when generating the image and for displaying the image on the image displaying means, wherein the processing unit is adapted for automatically determining whether the at least one image is to be displayed on the image displaying means in mirrored fashion, or not, depending on the at least one characteristic property.

A great benefit of the present invention is that the method and system is capable of automatically determining whether the at least one image taken by the camera is to be displayed in mirrored fashion, or not, depending on the particular situation, such as the analysed characteristic property of the at least one image and/or of the camera when the camera is generating the image. Thus, the method and system according to the invention are capable of automatically providing an improved intuitive display of the at least one image taken by the camera in situations as described in the introductory part of the description, such as video conferences or magic book applications. Therefore, the user is not requested anymore to manually decide whether to mirror or flip the displayed image, or not.

According to an embodiment of the invention, the step of analysing the at least one characteristic property of the camera when generating the image includes analysing of one or more camera poses when generating the image. In other words, depending on the results when analysing of one or more camera poses, the image is flipped, or not. For example, the step of analysing of one or more camera poses includes analysing a history of camera poses over a number of images generated by the camera, particularly heuristically analysing the history of camera poses over the number of images. By using statistical methods, the camera poses may be analysed over the number of images, and depending on the result the displayed image is flipped, or not.

Particularly, the following situations may be distinguished: A first situation in which the user is looking at a real object and the camera is also observing the real object from the same or almost the same perspective as the user, for example when the user holds the camera in his or her hand. The other situation is where the camera is observing the real object from an opposite perspective as compared to the user, for example in the situation where the camera is in front of the user. Particularly in the second situation, the image displayed to the user is more intuitive when the image is displayed in mirrored fashion, which is not the case in the first situation. In the embodiment described above, analysing of one or more camera poses enables the system to distinguish between these two situations as the poses of the camera in relation to real objects is heuristically distinguishable in the two situations.

Another way of automatically determining whether the at least one image is to be displayed on the image displaying means in mirrored fashion, or not, is analysing at least one characteristic property of the at least one image, for example analysing at least one feature of the at least one image. The step of analysing at least one feature may include searching and analysing the image for at least one characteristic of a human face. If at least one characteristic of a human face is detected by the system, this may be an indication that the second situation is present having the camera opposite to the user.

Another way of analysing the at least one characteristic property of the at least one image may include analysing a plurality of preferably subsequent images for at least one image area which is substantially stationary among the plurality of images. If the system does not detect an image area which is substantially stationary among the plurality of images, this may be an indication that the user is holding the camera in his hand, so that almost all image areas are moving when the camera is moved by the user, which is indicative of the first situation as described above.

Further embodiments and advantageous features of the invention are evident from the dependent claims.

The invention will now be described in more detail in conjunction with the accompanying drawings which illustrate various embodiments of the invention.

Figure 1:
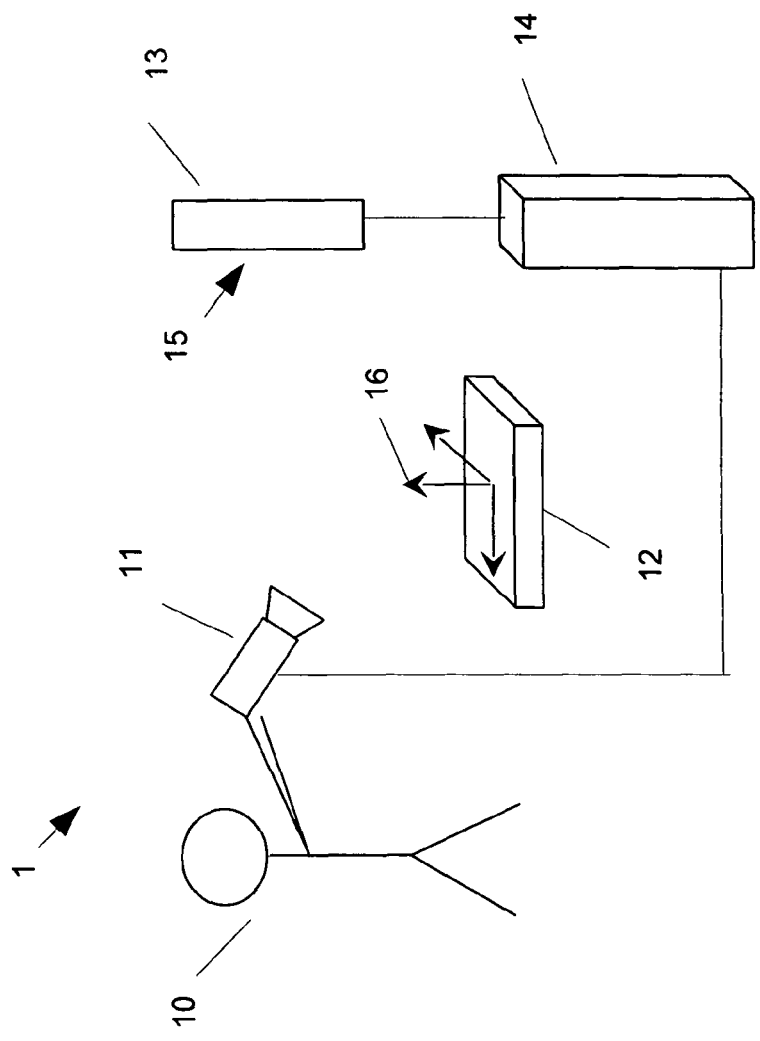
FIG. 1 shows a schematic illustration of a first embodiment of a system according to the invention.

In FIG. 1 there is shown a schematic illustration of a first embodiment of a system according to the invention. Particularly, FIG. 1 shows a system 1 in which a user 10 holds a camera 11 in his or her hand for generating at least one image of the real world, for example of the real object 12 as shown. According to a particular example, the real object 12 may be a book which is placed in front of the user 10, and the camera 11 takes an image of the book 12 to be displayed on a display screen. The book 12 is provided with an object coordinate system 16, such as shown in FIG. 1. Further, the camera 11 is coupled with an image displaying means 13, such as a display screen of a personal computer, or the like. However, any other image displaying means may be used which is suitable for displaying an image to a user, such as a head mounted display or any other type of mobile or stationary display device. Furthermore, a processing unit 14, which may be for example a personal computer (PC), is connected with the camera 11 and the image displaying means 13 in wired or wireless fashion.

In the situation as shown in FIG. 1 ("Version A") the user holds the camera 11 in his or her hand and is looking at the real object 12 placed in front of the user. The camera image 15 or images 15, such as a video flow of images, are displayed on the image displaying means 13 placed in front of the user 10. According to an embodiment of the invention, the images 15 are augmented with virtual objects according to the AR-technology. In the situation as shown in FIG. 1, when the user 10 moves the camera 11 to the left, the camera takes the images also from a position moved to the left, which is also applicable to other movement directions. According to a possible application, the user 10 is taking pictures or a video stream of a book 12, and on the image displaying means 13 the images 15 of the book 12 are shown augmented with interesting virtual information (magic book application as described above).

Figure 2:
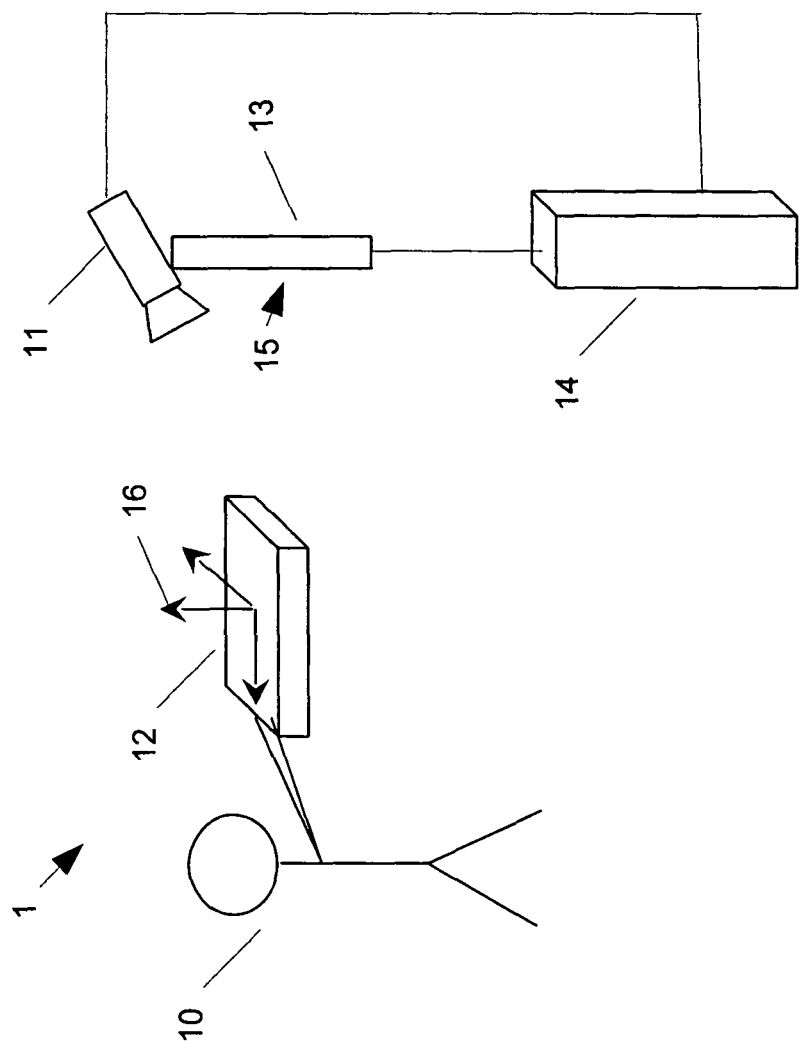
FIG. 2 shows a schematic illustration of a second embodiment of a system according to the invention.

In FIG. 2, there is shown another situation ("Version B") in which the system 1 substantially comprises the same components as described with reference to FIG. 1, however, in a different configuration. In the situation as shown in FIG. 2, the camera 11 is arranged opposite to the user 10, for example in front of the user 10 on an image displaying means 13, such as a display screen. By means of the camera 11, the user 10 may take pictures or images of himself or herself displayed on the display screen 13 and/or may take images of a real object 12, such as a book, held in the user's hands. The real object 12 is provided with an object coordinate system 16 similar as in FIG. 1. In the situation as shown in FIG. 2, the user 10 may move the book 12 with his or her hands in front of the camera 11, wherein the images taken by camera 11 are displayed as images 15 on the display screen 13.

Another situation applicable to FIG. 2 may be a video conference in which the user 10 shows and explains a technical object 12 to a remote party of the video conference.

In both applications of version B as shown in FIG. 2, if the user 10 or the real object 12 moves in one direction and the images 15 on the display screen 13 are not displayed in mirrored fashion, the respective movement is displayed on the display screen 13 in inverted manner which is a rather unnatural display. For example, a movement of the user's head or of the object 12 to the right is displayed on the display screen 13 as a movement to the left, and vice versa.

A particular aim of the present invention is to automatically distinguish between the situations of FIG. 1 and FIG. 2, i.e. between version A and version B, in order to automatically decide whether the displayed image is to be displayed in mirrored fashion, or not.

Figure 3:
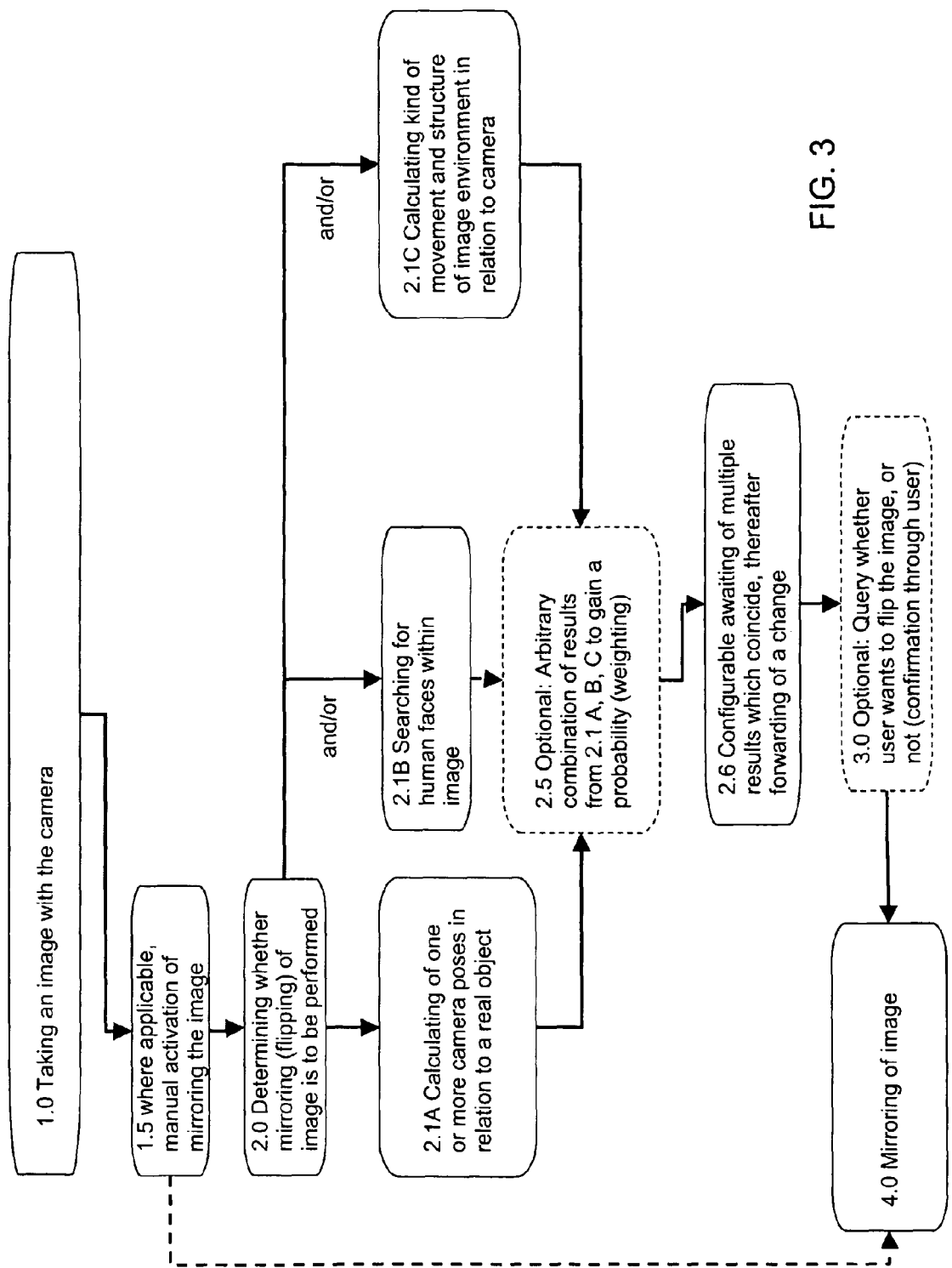
FIG. 3 shows a flowchart illustration of an analysing process according to an embodiment of the invention.

In FIG. 3, there is shown a flowchart illustration of an analysing process according to an embodiment of the invention. According to step 1.0, the camera 11 is taking an image or multiple images of a real object 12, such as a book. The image or images are transmitted to the processing unit 14 which is adapted for performing the process according to the present invention. Particularly, the processing unit 14, such as a PC, includes a computer program product having software code sections which are adapted for carrying out the process according to the invention, when the code sections are loaded into an internal memory of the PC 14. For example, the software code sections may be stored in an internal memory of the PC or may be provided on a hard disc or any other suitable storage means, wherein the program is loaded into the internal memory of the computer during operation. The camera data may be transmitted to the PC 14 in wired or wireless fashion.

According to step 1.5, there may be provided means to the user such as a corresponding display on the display screen 13 for manually activation of mirroring of the image taken by the camera.

According to step 2.0, the at least one characteristic property is analysed for determining whether the image or images are to be displayed in mirrored fashion, or not. Generally, it is possible to analyse only one of the images, for example the current image taken by the camera, or a plurality of images may be analysed.

The method steps 2.1A, 2.1B and 2.1C reflect respective embodiments of the invention which can be performed alone, respectively, or in arbitrary combination with each other, as shown in step 2.5. For example, the results gained from steps 2.1A, 2.1B and/or 2.1C may be weighted (with different weighting factors, or not) in order to gain a probability for deciding whether the displayed image is to be mirrored, or not. However, there may be situations where one of the steps 2.1A, 2.1B or 2.1C is sufficient for the determination whether the image is to be mirrored or not. Moreover, it may be appropriate in some cases to combine intermediary results or calculations from steps 2.1A, 2.1B and/or 2.1C in a similar manner.

According to step 2.1A, one or more camera poses when generating the image are analysed. From the prior art, there are known different marker based or markerless tracking methods for determining a respective camera pose in relation to a captured real object. Moreover, from the prior art there are known so called simultaneous localization and tracking (SLAM) methods. All these methods serve for determining the position and orientation (pose) of a camera in relation to the real world or of part of the real world. If there is no pre-information available, in some cases it is not possible to determine the absolute pose of the camera in relation to the real world or part of the real world, but only the changes of the camera poses from a particular point of time.

The method step 2.1A uses the fact that version A and version B as shown in FIGS. 1 and 2 are different regarding the poses of the camera in relation to the captured real object, and are heuristically distinguishable. In other words, statistical methods may be used for determining whether version A or version B is the particular current situation.

Figure 4:
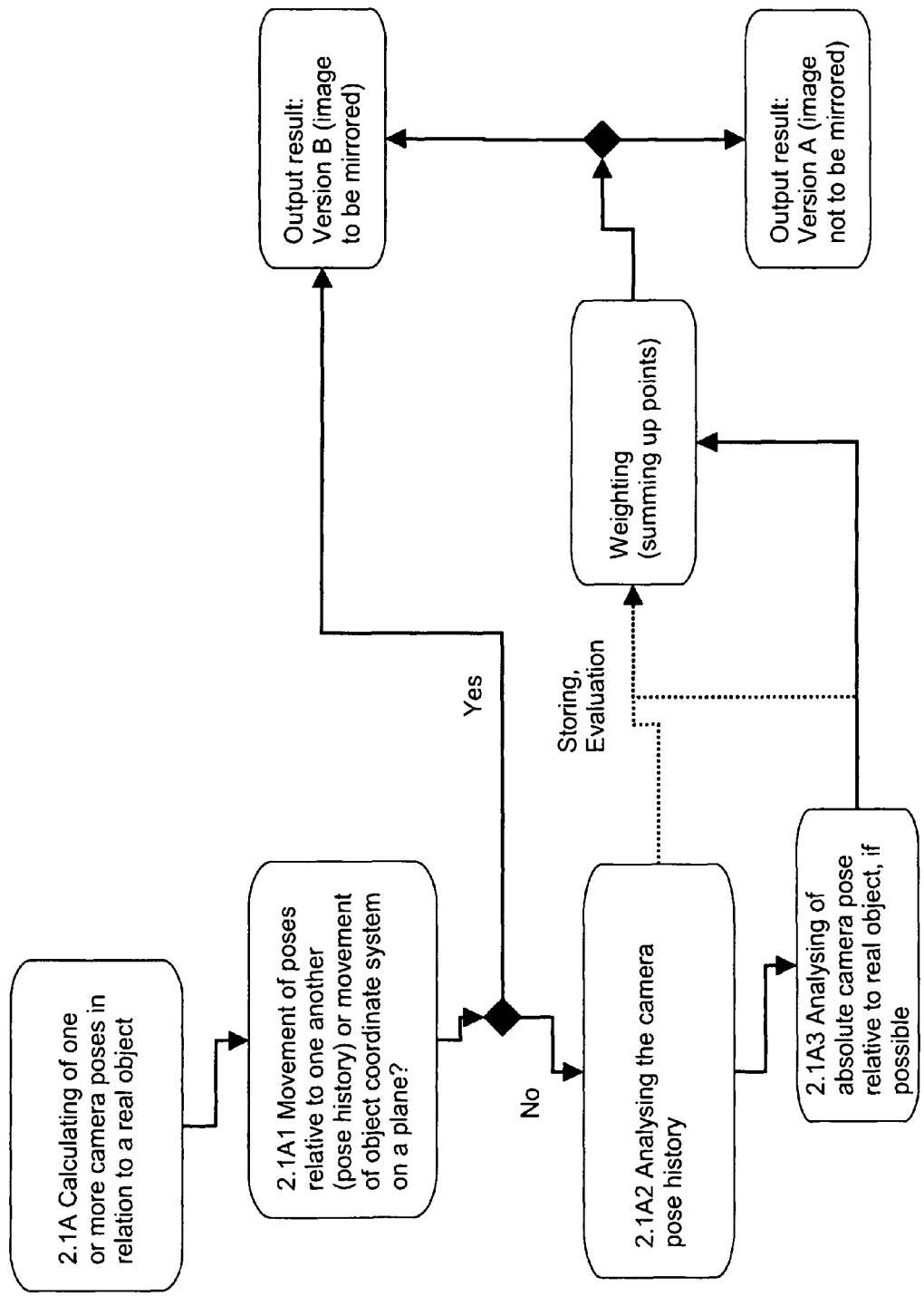
FIG. 4 shows a flowchart illustration of a part of the process as shown in FIG. 3 according to an embodiment of the invention.

In FIG. 4, there is shown a flowchart illustration of the method step 2.1A as referred to in FIG. 3 according to an embodiment of the invention. According to step 2.1A1 a history of camera poses over a number of images is analysed. For example, it is analysed whether the movement of camera poses relative to one another, each in relation to the real object 12, or the movement of the object coordinate system 16 is substantially on a plane. In this method step, it is considered that in a plurality of situations the system is used in combination with a table on which the real object, such as the book 12, is placed upon. In this case, the book 12 may be moved on the table, for example the book may be moved in any translational direction or may be turned around on the table. In this case, the object coordinate system 16 moves approximately on a plane (the plane defined by the table top), so that in this situation it is assumed that version B according to FIG. 2 is the current situation. In this case, the image displayed on display screen 13 is mirrored or flipped.

Figure 7:
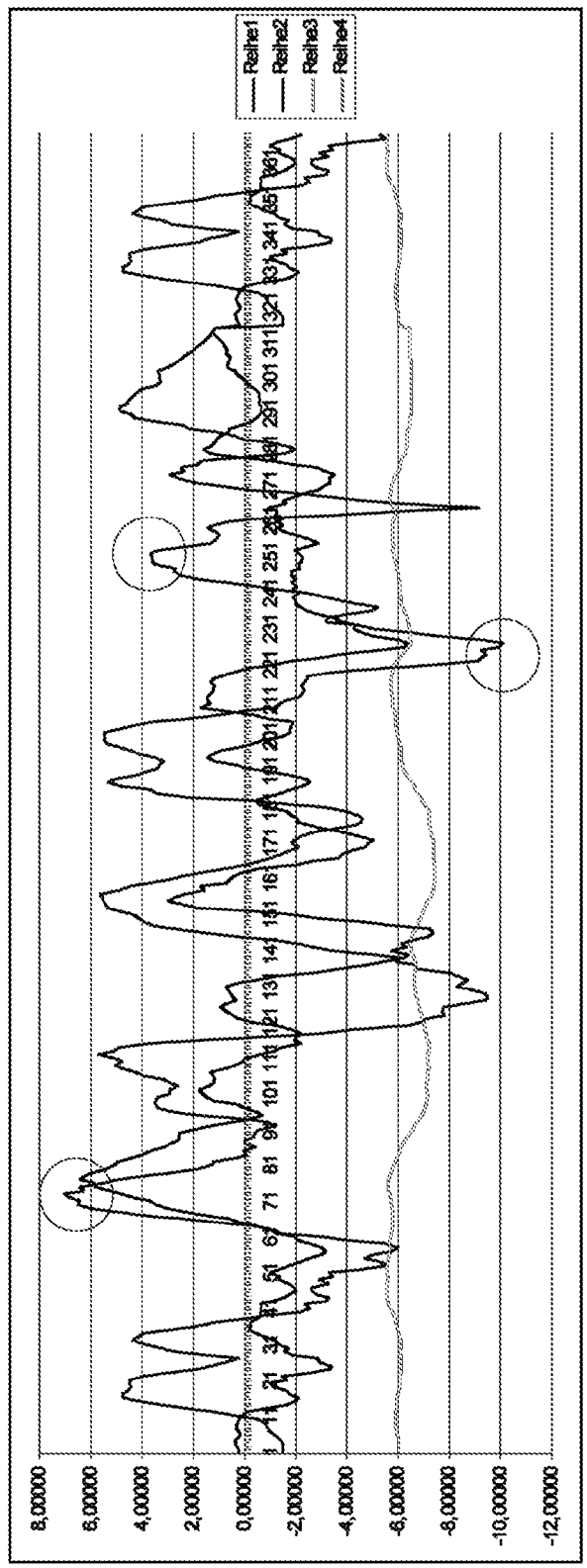
FIGS. 7, 8 show a respective illustration showing each an exemplary history of translation values of camera poses over a number of images.
Figure 8:
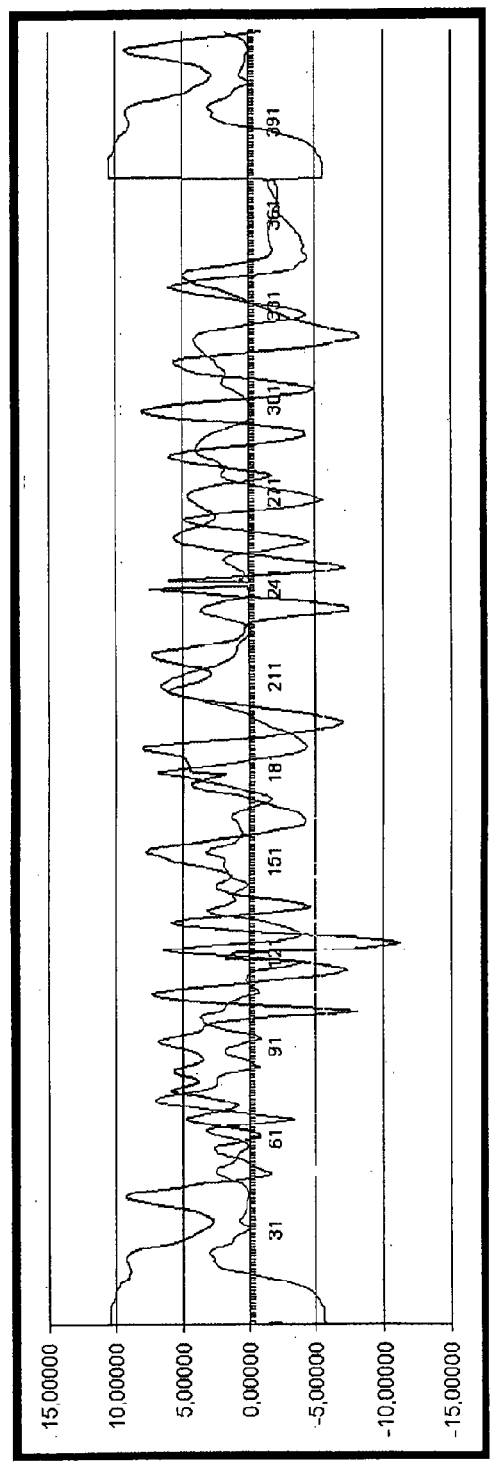

According to another embodiment, as shown with respect to step 2.1A2, the history of translation values of the respective camera poses over a number of images may be analysed. In this regard, FIGS. 7 and 8 show a respective illustration each depicting an exemplary history of camera translation values of camera poses over a number of images. In vertical direction, the translation values are depicted, whereas in horizontal direction the number of images are depicted. The curve as shown in FIG. 7 depicts a curve of translation values when having a situation according to version A, whereas the curve according to FIG. 8 shows camera translation values when having a situation according to version B. If the user 10 holds the camera 11 in his or her hands according to version A (FIG. 7), the curve of translation values is indicative of a more "disturbed" movement of the hand, as can be seen particularly when analysing the extrema values as depicted within the circles shown in FIG. 7. The rather unsteady curve at the extrema values is an indication of a "shaky" hand of the user 10, so that it can be assumed that the user is holding the camera in his or her hands. On the other hand, the rather smooth curve as shown in FIG. 8 is indicative of a situation where a real object is moved, for example on a table top, in relation to a fixed camera. Therefore, by means of analysing extrema values and/or the smoothness of the translation values of the camera poses over a number of images, e.g. by using suitable Fourier analysis methods or the like, it may be determined that version A or version B is the current situation.

In an additional step 2.1A3, which may be optional or not, it may be further analysed at least one absolute camera pose relative to the captured real object, if it is possible to determine the absolute camera pose. Particularly in the situation where the user is holding a book in his or her hands and is reading the book, it may be assumed that the user is holding the book in a manner that the letters are turned to the user in readable form. Thus, if the object coordinate system of the book in relation to the letters is known, it may be determined whether the camera is observing the book so that the letters are readable, or whether the camera is observing the book from an opposite direction so that the letters are not readable. In the latter case, which is indicative of version B as shown in FIG. 2, the displayed image should be mirrored or flipped.

The results of method steps 2.1A2 and 2.1A3 may be stored and evaluated, and may be weighted, e.g., by assigning a respective number of points to each of the results. With summing up the assigned points, it may be decided whether the current situation corresponds with version A or version B.

Figure 5:
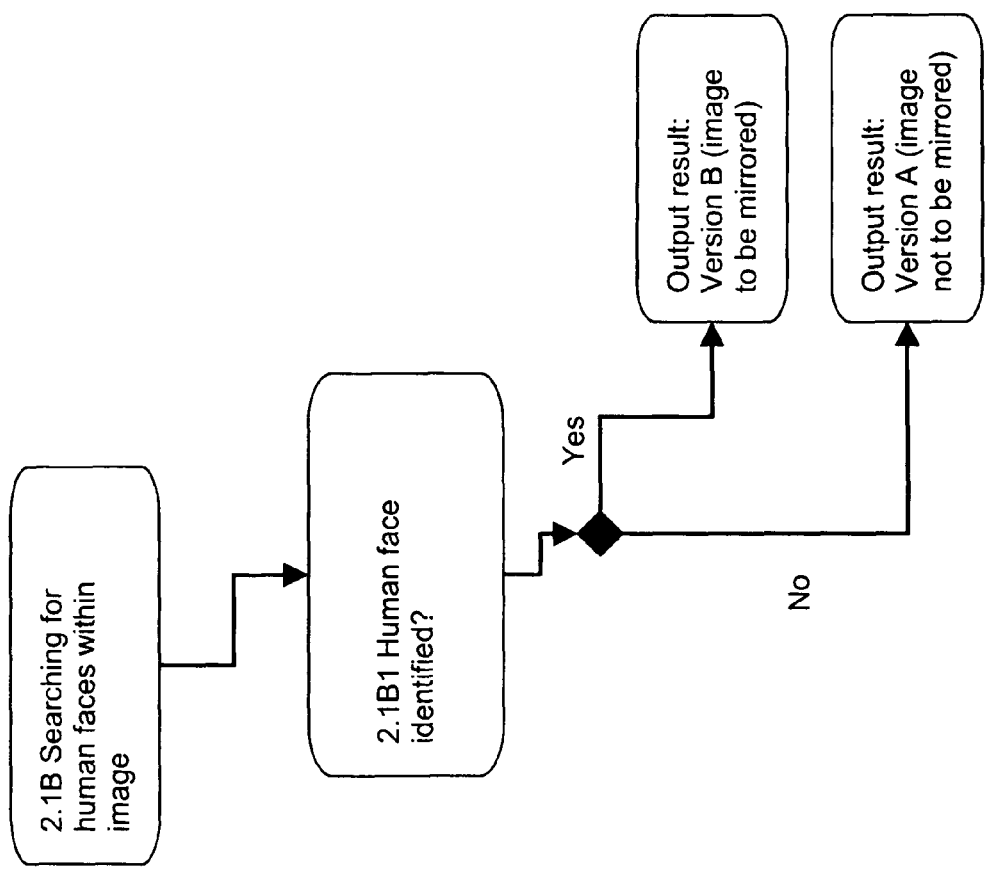
FIG. 5 shows a flowchart illustration of another part of the process as shown in FIG. 3 according to an embodiment of the invention.

In FIG. 5, there is illustrated a flowchart of another part of the process as shown in FIG. 3, particularly an embodiment of method step 2.1B. According to method step 2.1B, at least one characteristic property of one or more images is analysed in that at least one feature of the image or images is analysed. Particularly, it is searched for features being characteristic for a human face, wherein an identified human face in the image may be an indication that the situation corresponds with version B. For analysing the image for at least one characteristic of a human face, so-called Support Vector Machines may be used. This embodiment may be used in case of relative tracking, such as SLAM.

Figure 6:
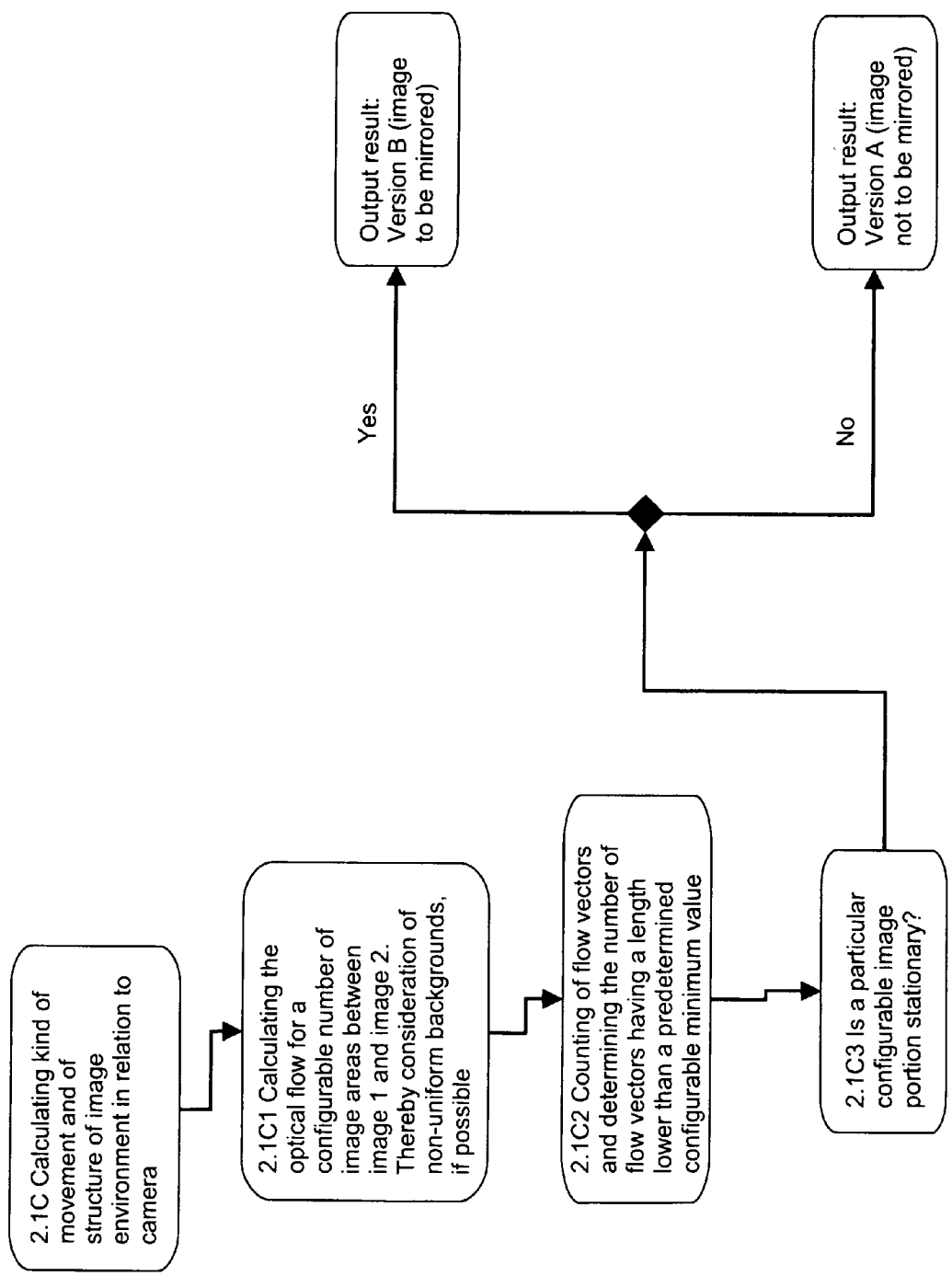
FIG. 6 shows a flowchart illustration of another part of the process as shown in FIG. 3 according to another embodiment of the invention.

In FIG. 6 there is shown a flowchart depicting an embodiment of method step 2.1C as shown in FIG. 3. In method step 2.1C, the kind of movement and the structure of the image environment in relation to the camera is calculated. To this end, a plurality of subsequent images is analysed for at least one image area which is substantially stationary among the plurality of images. If the camera is moved according to a situation as shown in FIG. 1 (version A), the probability is rather low that any one of the image areas remains stationary over the number of images during the movement of the camera. However, in the situation where the camera is fixed (version B) according to FIG. 2, if only the real object 12 is moved there will be, at least in some image sequences, at least some image areas (e.g. depicting the table or any background) which remain stationary, being indicative that a part of the real world remains stationary.

In a particular embodiment of this method step, it is determined according to method steps 2.1C1 and 2.1C2 an optical flow between two subsequent images for a configurable number of image areas. For example, there is calculated the optical flow for a configurable number of image areas between a first image (image 1) and a subsequent image (image 2), wherein non-uniform backgrounds are considered, if possible. Thereafter, respective flow vectors when calculating the optical flow are determined, wherein the number of the flow vectors having a length lower than a predetermined configurable minimum value is determined which may be indicative of a stationary image portion. If it is determined that a particular image portion is stationary, it may be decided that the current situation corresponds with version B so that the displayed image is to be mirrored or flipped.

Instead of or additionally to determining the optical flow between two subsequent images, a method of subtracting the images may also be used, such as so-called Background Subtraction.

According to step 2.6 of FIG. 3, it may be configured by the user to await a configurable number of coinciding results of any one(s) of the steps 2.1A, 2.1B and/or 2.1C, combined in step 2.5 where applicable, before forwarding of a change (i.e. a change from non-flipped to flipped image, or vice versa).

In an optional step 3.0 the user may decide (e.g. by clicking on a respective button on the screen) whether to flip the image, or not. This reflects a possible confirmation of the system's flipping or non-flipping decision through the user.

The method and system according to the invention are particularly advantageous in situations where system configurations according to version A or version B may be used, for example when applying the camera 11 as a webcam. The invention is particularly useful in situations where the system configuration may be switched between version A and version B dynamically, wherein the system can automatically decide whether the image is to be mirrored, or not. According to the invention, there is no need to interrupt the process of such application by cumbersome manual switching operations, as described above.

While the invention has been described with reference to exemplary embodiments, it will be understood by those skilled in the art that various changes may be made without departing from the scope of the claims.

The invention claimed is:

1. A method for displaying an image generated by at least one camera (11) on an image display (13), comprising:
    generating at least one image (15) by at least one camera (11) with poses configured to capture at least one real object (12) wherein the surface of said real object is parallel to the camera pose and is approximately on a plane with the camera;
    displaying the at least one image (15) on an image display (13);
    analysing (2.1 B, 2.1 C) at least one characteristic property of the at least one image which includes analysing at least one feature of the at least one image, wherein said analysing the at least one feature of the at least one image comprises searching and analysing (2.1B, 2.1B1) the at least one image for at least one characteristic of a human face;
    and/or
    analysing (2.1A) at least one characteristic property of the at least one camera when generating the at least one image which comprises determining one or more camera poses in relation to the at least one real object that is captured when generating the at least one image; automatically determining whether the at least one image (15) is to be displayed on the image display (13) in mirrored fashion, or not, depending on the at least one characteristic property.

2. The method according to claim 1, wherein said determining said one or more camera poses comprises analysing (2.1A1, 2.1A2, 2.1A3) a history of camera poses over a number of images generated by the at least one camera, including heuristically analysing the history of camera poses over the number of images.

3. The method according to claim 2, wherein said analysing the history of camera poses over the number of images generated by the at least one camera comprises analysing (2.1A2) a history of translation values of respective camera poses over the number of images, including analysing of extrema values and/or smoothness of translation values.

4. The method according to claim 1, wherein said determining of one or more camera poses comprises determining (2.1A3) at least one absolute camera pose relative to the at least one real object (12).

5. The method according to claim 1, wherein said analysing the at least one characteristic property of the at least one image comprises analysing (2.1C) a plurality of images selected from said at least one image, for at least one image area which is substantially stationary among the plurality of images.

6. The method according to claim 5, wherein said analysing said plurality of images for at least one stationary image area comprises determining (2.1C1, 2.1C2) an optical flow between two subsequent images for a configurable number of image areas.

7. The method according to claim 6, wherein said determining said optical flow between said two subsequent images comprises determining (2.1C2) respective flow vectors and determining a number of the flow vectors having a length lower than a predetermined configurable minimum value.

8. The method according to claim 1, wherein said at least one image is augmented with at least one virtual object using an Augmented Reality technology.

9. A system (1) for displaying an image, comprising:
a camera (11) with pose configured to generate at least one image (15) of at least one real object (12) captured by said camera wherein the surface of said real object is parallel to the camera pose and is approximately on a plane with the camera;
an image display (13) coupled with the camera (11) and configured to display the at least one image generated by the camera;
a processing unit (14) connected with the camera (11) and the image display (13) wherein said processing unit is configured to analyse at least one characteristic property of the at least one image which comprises
analyse at least one feature of the at least one image, wherein said analyse the at least one feature of the at least one image comprises searching and analysing (2.1 B, 2.1 B1) the at least one image for at least one characteristic of a human face;
and/or
analyse at least one characteristic property of the camera when the image is generated and determine one or more camera poses in relation to the at least one real object when the at least one image is generated, and
display the at least one image on the image display;
said processing unit (14) configured to automatically determine whether the at least one image (15) is to be displayed on the image display (13) in mirrored fashion, or not, based on the at least one characteristic property.

10. A non-transitory computer programmable product comprising software code sections which are configured to carry out the method according to claim 1 when the code sections are loaded into an internal memory of a computer device.

* * * * *